Aug. 6, 1957

R. M. HENSEN 2,801,606

EGG OILING MACHINE

Filed Oct. 1, 1954

Ray M. Hensen
INVENTOR.

BY *Clarence A. O'Brien*
and *Harvey B. Jacobson*
Attorneys

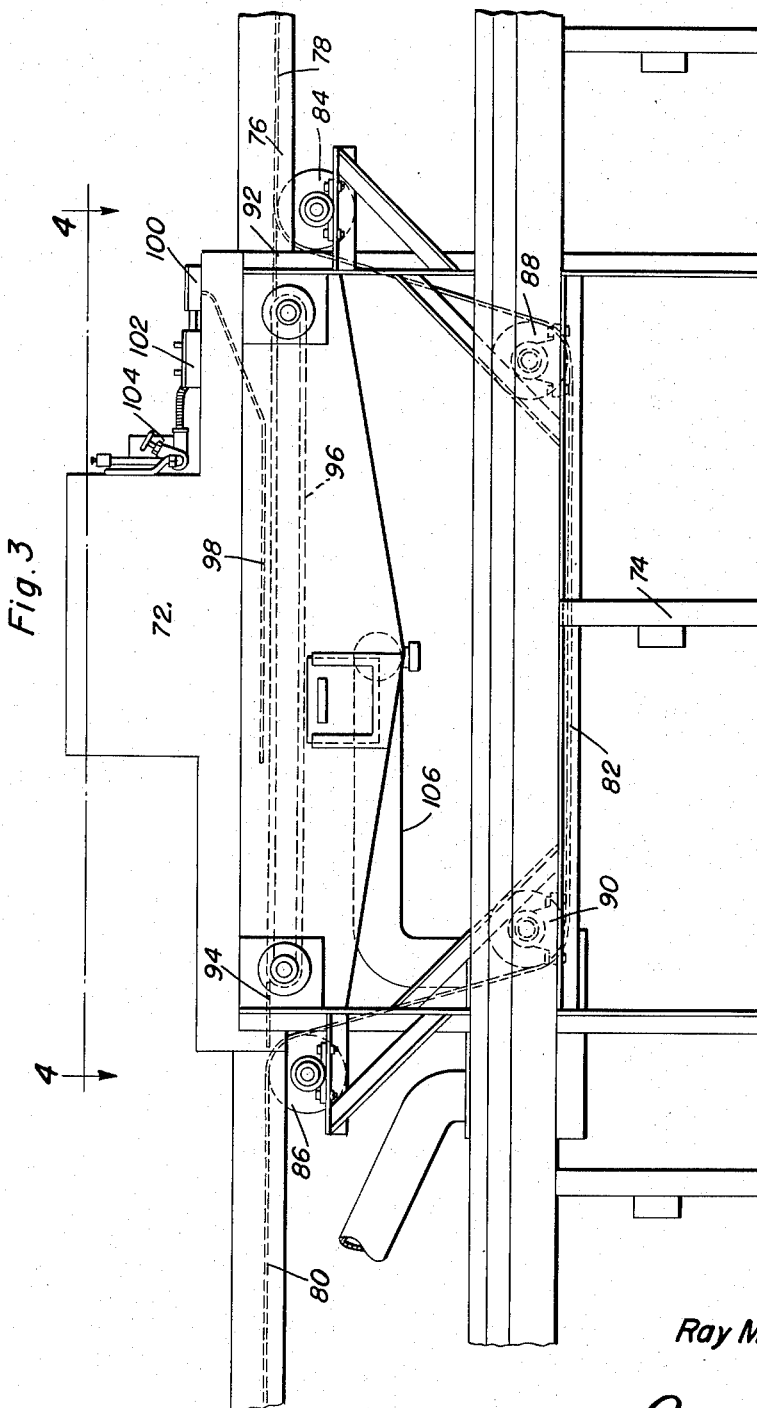

Aug. 6, 1957 R. M. HENSEN 2,801,606
EGG OILING MACHINE
Filed Oct. 1, 1954 5 Sheets-Sheet 3

Ray M. Hensen
INVENTOR.

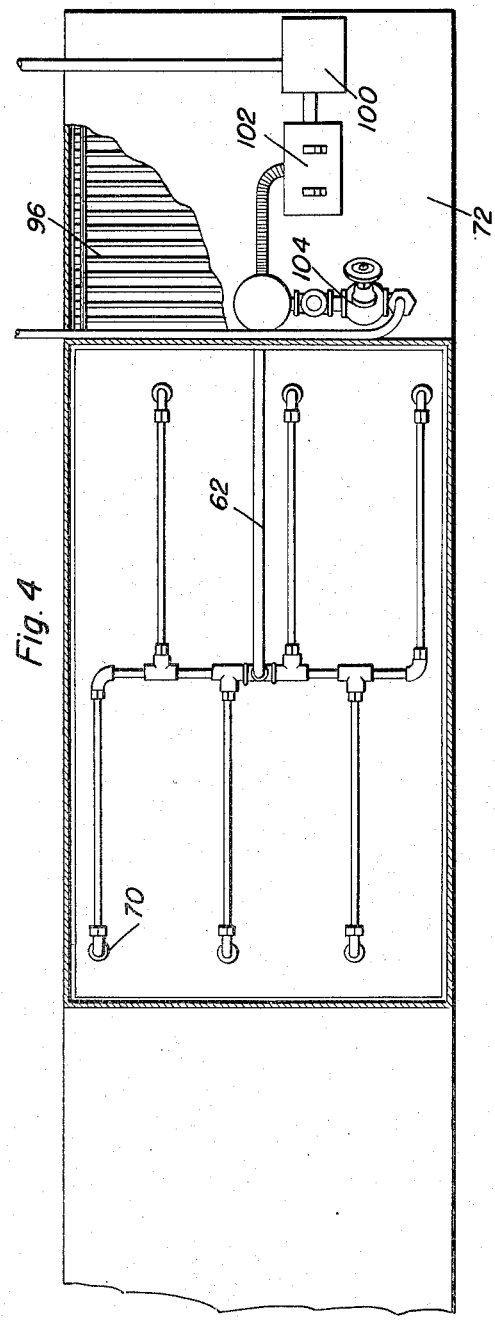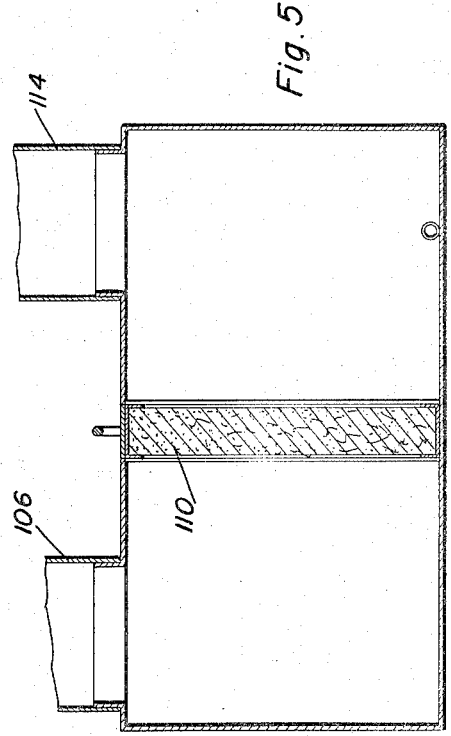

United States Patent Office 2,801,606
Patented Aug. 6, 1957

2,801,606

EGG OILING MACHINE

Ray M. Hensen, Adrian, Minn.

Application October 1, 1954, Serial No. 459,651

1 Claim. (Cl. 118—2)

This invention relates to a novel produce treating apparatus, and more particularly to an egg oiling machine.

It has long been well known that by immersing fresh eggs, such as hen eggs, in a heated bath of a suitable oil, deterioration of the eggs is inhibited. It is therefore the primary object of the present invention to provide means for treating eggs prior to packing and after being candled in a convenient manner wherein minimum breakage will occur and an optimum coating of oil will be achieved.

A further object of the invention resides in the provision of a novel egg oiling machine which will substantially reduce the labor of oiling and treating eggs prior to packing and which will have means associated therewith for saving a maximum amount of the oil used and not actually coated on the eggs.

The construction of this invention features a novel hood having an inlet opening and an outlet opening which is positioned adjacent a conveyor having a downwardly offset portion. The hood has means associated therein for spraying the suitable oil for the eggs and also has suction means at the bottom thereof for withdrawing the oil saturated air from the hood so that unused oil in the hood can be reclaimed for further use.

Still further objects and features of this invention reside in the provision of an egg oiling machine which will substantially reduce the cost of handling and preservative treatment of eggs, which is simple to use and highly efficient in operation.

These, together with the various ancillary objects and features of the invention which will become apparent as the following description proceeds, are attained by this egg oiling machine, a preferred embodiment of which has been illustrated in the accompanying drawings, by way of example only, wherein:

Figure 3 is an elevational view of the hood and associated elements utilized in the invention;

Figure 4 is a sectional detail view as taken along the plane of line 4—4 in Figure 3 and illustrating the arrangement of the oil spraying means within the hood;

Figure 5 is a sectional detail view of the oil filtering means for saving oil.

Figure 1:
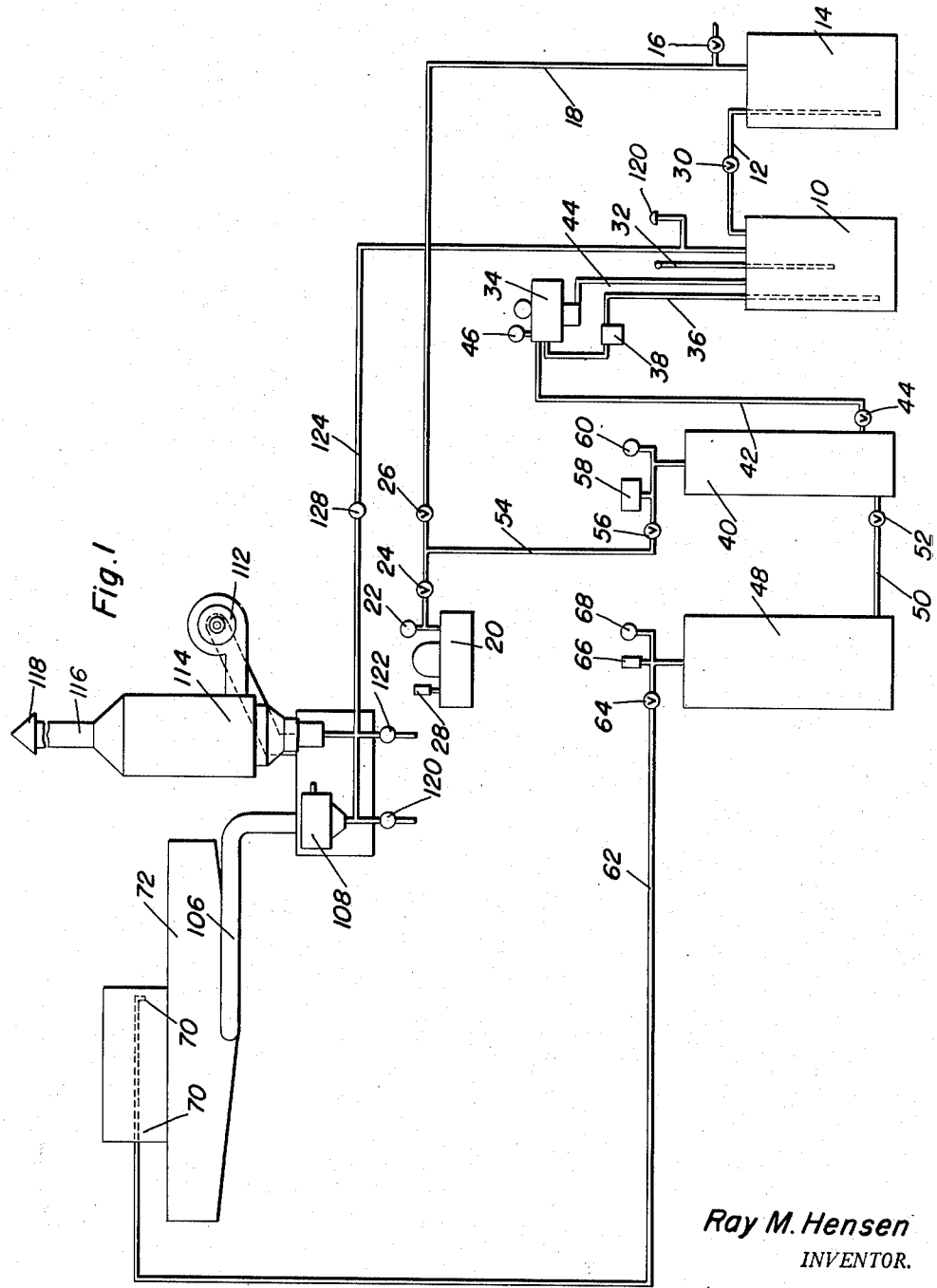
Figure 1 is a schematic diagram illustrating the major components of the egg oiling machine comprising the present invention.
Figure 2:
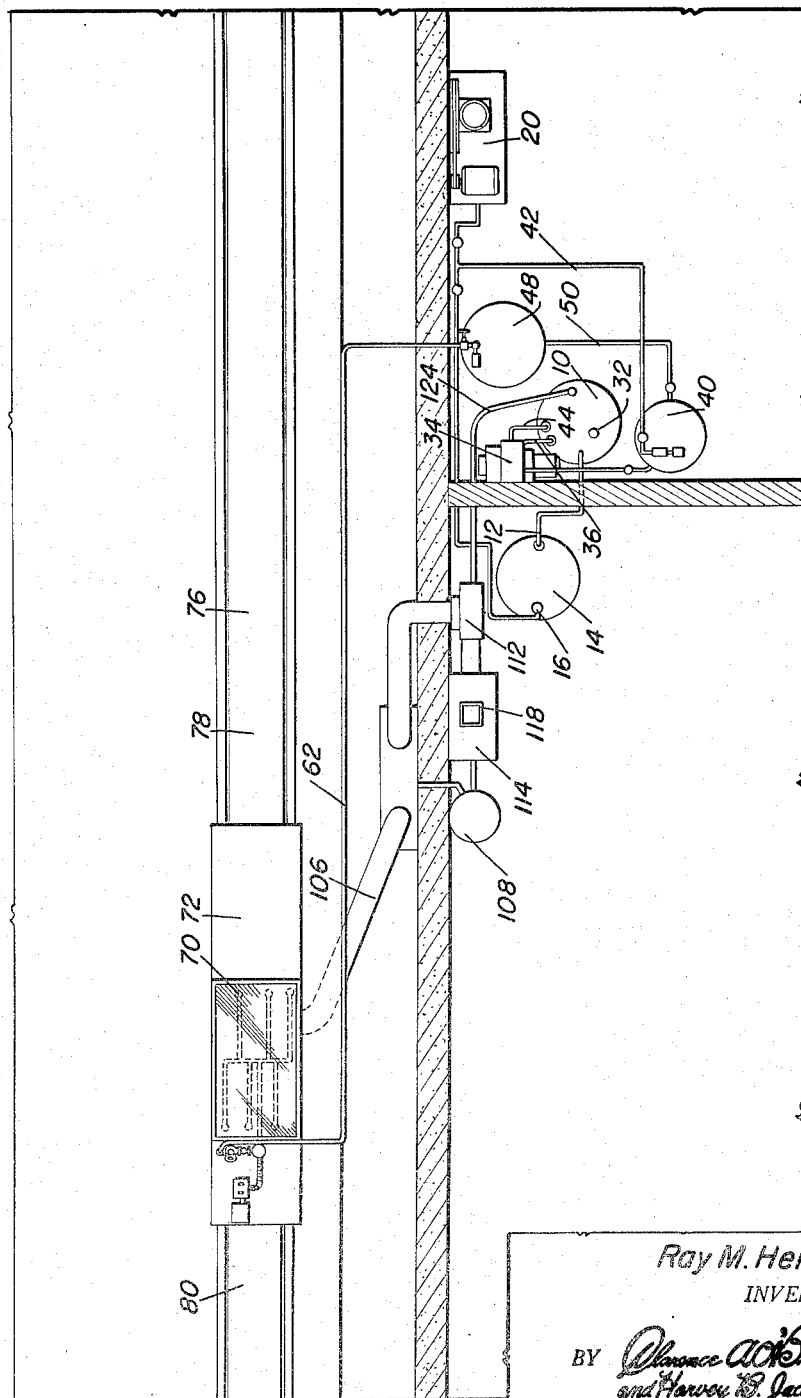
Figure 2 is a plan view showing the manner in which the invention may be installed in a building in which eggs are treated and packed.
Figure 6:
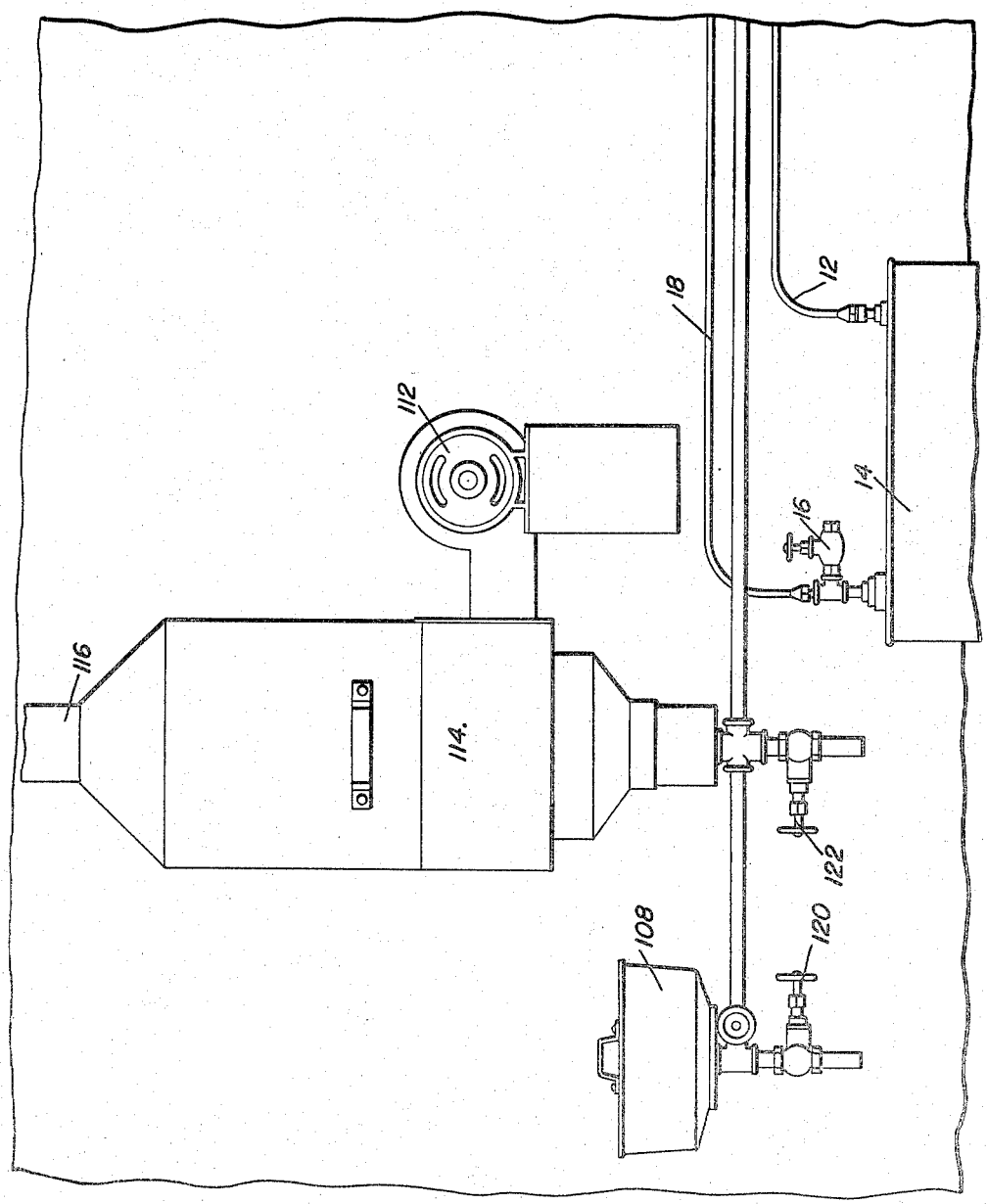
Figure 6 is an elevational view of the flow control means provided for delivering oil to the oil spraying means.

Referring now to the accompanying drawings wherein like reference numerals are used to designate like parts throughout the various views, and with initial attention directed to Figure 1 wherein the invention is shown schematically, it will be noted that the egg oiling machine comprising the present invention includes a supply tank 10 which is connected by means of an oil line 12 to an oil barrel 14 which may be replaced, as necessary, so that the supply tank 10 can be maintained suitably filled with oil. An air release valve 16 is provided for the air pressure line 18 connecting the oil barrel 14 with a compressor 20. The pressure gage 22 is provided, of course, for the air pressure line 18, and suitable control valves 24 and 26 are likewise provided. A safety valve 28 is provided for the compressor 20. Utilizing the compressor 20, oil from the barrel 14 can be forced into the supply tank 10 through the oil conduit 12. A valve 30 is provided for controlling flow of fluid through the oil line 12.

The supply tank 10 can be provided with an aluminum float rod 32 provided with a glass float, not shown, for indicating the quantity of oil therein so as to inform the operator of the egg oiling machine as to the necessity for refilling the supply tank 10 with oil from the barrel 14.

An oil pump 34 is connected by a pump suction line 36 through an oil filter 38 to the supply tank 10 and is adapted to deliver oil to the expansion tank 40 through a discharge line 42 from the pump to the expansion tank. A valve 44 controls flow of fluid through the discharge line 42. A pump or by-pass line 45 connects the pump 34 with the oil supply tank 10 and the pump 34 is, of course, provided with suitable pressure gauges, as at 46.

Connecting the expansion tank 40 with an electric heater 48 is a conduit 50 controlled by valve 52.

An air pressure line 54 controlled by a valve 56 and having a pressure control device 58 therein, such as a Minneapolis-Honeywell "Pressurtrol" for automatically shutting off the pump 34 when pressure rises to a desired level, as well as a pressure gauge 60 is connected between the oil pressure line 18 and the expansion tank 40.

Connected to the electric heater 48 is the insulated hot oil delivery line 62 controlled by valve 64 and provided with a safety valve 66 and a pressure gauge 68. The hot oil delivery line 62 is connected to the various nozzles 70 mounted within the hood 72.

Referring now more particularly to Figure 3, it will be noted that the hood 72 is arranged on a suitable support framework 74 in alignment with a conveyor 76 having a delivery section 78 delivering eggs from the candler to the hood 72 and a discharge section 80 together with a downwardly offset section 82. It is noted that the conveyor 78 is entrained about the rollers 84 and 86 as well as downwardly offset rollers 88 and 90. In alignment with the conveyor sections 78 and 80, the hood 72 is provided with openings, and mounted within the openings are plates 92 and 94 horizontally aligned with the conveyor sections 78 and 80. Mounted within the hood 72 is an endless belt conveyor 96 which receives eggs from the plate 92 after being discharged from the delivery section 78 of the conveyor 76 and delivers eggs off the plate 94 from which they are pushed onto the discharge section 80 of the conveyor 76. The conveyor 96 consists of an endless series of spaced slots through which oil can readily drain.

There is mounted within the hood 72 a steel wire trip 98 which is adapted to actuate a microswitch 100 which controls a solenoid valve relay switch 102 for actuating a magnetic valve 104 provided for further controlling flow of oil from the nozzles 70. Thus, eggs passing from the conveyor section 78 and onto the conveyor 96 will actuate the steel wire trip 98 to actuate the microswitch 100 to cause the valve 104 to permit the oil under pressure and which has previously been heated to be sprayed onto eggs which are on the conveyor 96.

Opening into the hood 72 is an air suction and oil drain line 106 which is connected to a screen oil and air filter 108 having a suitable oil trap and filter 110. The air is drawn through the line 106 by means of a motor driven fan 112 and thence drawn into an air chamber 114 having a filter disk, for filtering the discharge air which is led out through the discharge vent 116 having a vent cap 118.

The screen oil and air filter 108 is provided with a cleaning valve 120 and likewise, a cleaning valve 122 is provided for the air chamber 114. Oil drained from the air chamber 114 as well as from the oil filter 108 is delivered through the return oil line 124 to the supply tank 10 and is vented, as at 126. A shut-off valve 128 may be provided in the line 124 for use when the unit is to be steam cleaned.

In operation, as the eggs come down the conveyor belt 76 from the candlers to the packing men, they enter the hood and trip the steel wire trip 98 which through the microswitch 100 and the relay 102 actuates the magnetic valve 104 to cause the oil to be sprayed on the eggs. That part of the oil not coated on the eggs is then recovered through passage through the line 106 into the filter 108 and air chamber 114 and thence through the line 124 to the oil supply tank 10. The oil supply tank 10 receives its oil from successive barrels 14 and oil is delivered to the nozzle 70 from the supply tank 10 after being heated in the heater 48 and with the oil under suitable pressure, due to the function of the pump 34. The expansion tank 40 serves as a supply and expansion tank for heater 48.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and changes may be resorted to, falling within the scope of the appended claim.

What is claimed as new is as follows:

An egg oiling machine comprising an endless conveyor having a loading section and a discharge section, a hood positioned between said loading section and said discharge section, conveyor means entirely mounted inside said hood for receiving eggs from said loading section and carrying eggs toward said discharge section, said conveyor means being entirely disposed between said loading section and said discharge section and being entirely separate from said conveyor and being coplanar with said loading section and said discharge section, said conveyor having a depressed section between said loading section and said discharge section, said depressed section underlying said hood and said conveyor means, said loading section and said discharge section being entirely outside of said hood, oil spraying means in said hood, solenoid means in alignment with said conveyor means for actuating said oil spraying means, means for delivering oil under pressure to said oil spraying means, said hood having suction means at the bottom thereof, oil recovery means connected to said suction means, a microswitch for actuating said solenoid means, and a resilient egg engaging pin positioned over and in alignment with said conveyor means for operating said mircoswitch.

References Cited in the file of this patent
UNITED STATES PATENTS

| | | |
|---|---|---|
| 1,724,643 | Debus | Aug. 13, 1929 |
| 1,816,596 | MacLean | July 28, 1931 |
| 1,827,876 | Lang | Oct. 20, 1931 |
| 1,885,453 | Larson | Nov. 1, 1932 |
| 2,110,052 | Paasche | Mar. 1, 1938 |
| 2,206,179 | Frank | July 2, 1940 |
| 2,439,808 | Hodgson | Apr. 20, 1948 |
| 2,633,820 | Koerber | Apr. 7, 1953 |